(12) United States Patent
White

(10) Patent No.: US 12,361,148 B1
(45) Date of Patent: Jul. 15, 2025

(54) DIGITAL LOCK AND KEY SYSTEM USING NON-FUNGIBLE DIGITAL TOKENS AND METHODS THEREOF

(71) Applicant: Ryan White, McKinney, TX (US)

(72) Inventor: Ryan White, McKinney, TX (US)

( * ) Notice: Subject to any disclaimer, the term of this patent is extended or adjusted under 35 U.S.C. 154(b) by 129 days.

(21) Appl. No.: 17/962,266

(22) Filed: Oct. 7, 2022

Related U.S. Application Data

(60) Provisional application No. 63/395,200, filed on Aug. 4, 2022.

(51) Int. Cl.
 *G06F 21/62* (2013.01)
 *G06F 21/60* (2013.01)
 *H04L 9/32* (2006.01)

(52) U.S. Cl.
 CPC ........ *G06F 21/6209* (2013.01); *G06F 21/602* (2013.01); *H04L 9/3213* (2013.01); *H04L 2209/60* (2013.01)

(58) Field of Classification Search
 CPC . G06F 21/6209; G06F 21/602; H04L 9/3213; H04L 2209/60
 See application file for complete search history.

(56) References Cited

U.S. PATENT DOCUMENTS

| | | | |
|---|---|---|---|
| 10,505,726 B1* | 12/2019 | Andon | H04L 9/0866 |
| 11,468,431 B2* | 10/2022 | Williams | G06Q 20/40 |
| 2020/0184041 A1* | 6/2020 | Andon | H04L 9/0891 |
| 2020/0273048 A1* | 8/2020 | Andon | G06Q 10/02 |
| 2021/0119807 A1* | 4/2021 | Chen | H04L 9/3242 |
| 2022/0294630 A1* | 9/2022 | Collen | H04L 9/3213 |
| 2023/0421399 A1* | 12/2023 | Quirk | H04L 9/3239 |
| 2024/0020683 A1* | 1/2024 | Bacon | G06Q 20/3674 |

* cited by examiner

*Primary Examiner* — Hee K Song
(74) *Attorney, Agent, or Firm* — Richard Eldredge; Leavitt Eldredge Law Firm

(57) ABSTRACT

A digital lock and key system using non-fungible digital tokens is disclosed. The digital lock and key system includes a non-fungible digital token having a blockchain address; and a piece of property having a lock; wherein the lock verifies whether the user possesses a non-fungible digital token with a recognized blockchain address; wherein the lock grants access to the piece of property when the lock verifies the user's non-fungible digital token; wherein the lock denies access to the piece of property when the lock cannot verify the user's non-fungible digital token; wherein the piece of property is physical, non-physical, or both.

2 Claims, 2 Drawing Sheets

DIGITAL LOCK AND KEY SYSTEM USING NON-FUNGIBLE DIGITAL TOKENS AND METHODS THEREOF

CROSS REFERENCE TO RELATED APPLICATIONS

This application claims the benefit of U.S. Provisional Application 63/395,200, filed Aug. 4, 2022, of which is hereby incorporated by reference in its entirety.

BACKGROUND

1. Field of the Invention

The present invention relates generally to lock and key systems, and more specifically to a digital lock and key system for granting access to physical and non-physical property.

2. Description of Related Art

Lock and key systems are well known in the art and are effective means to prevent unauthorized access to physical property. Traditionally, a physical key is used to operate a lock, i.e., to lock or unlock it. In recent years, technology advancements in non-physical property, such as digital currency, has become widespread. Because of the nature of such property, conventional lock and key systems are inapplicable. Moreover, traditional keys can be replicated, making such keys vulnerable to unauthorized possession. Hence, it would be advantageous to have a lock and key system designed to grant access into non-physical property as well has provide improved security against unauthorized access.

Accordingly, although great strides have been made in the area of lock and key systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
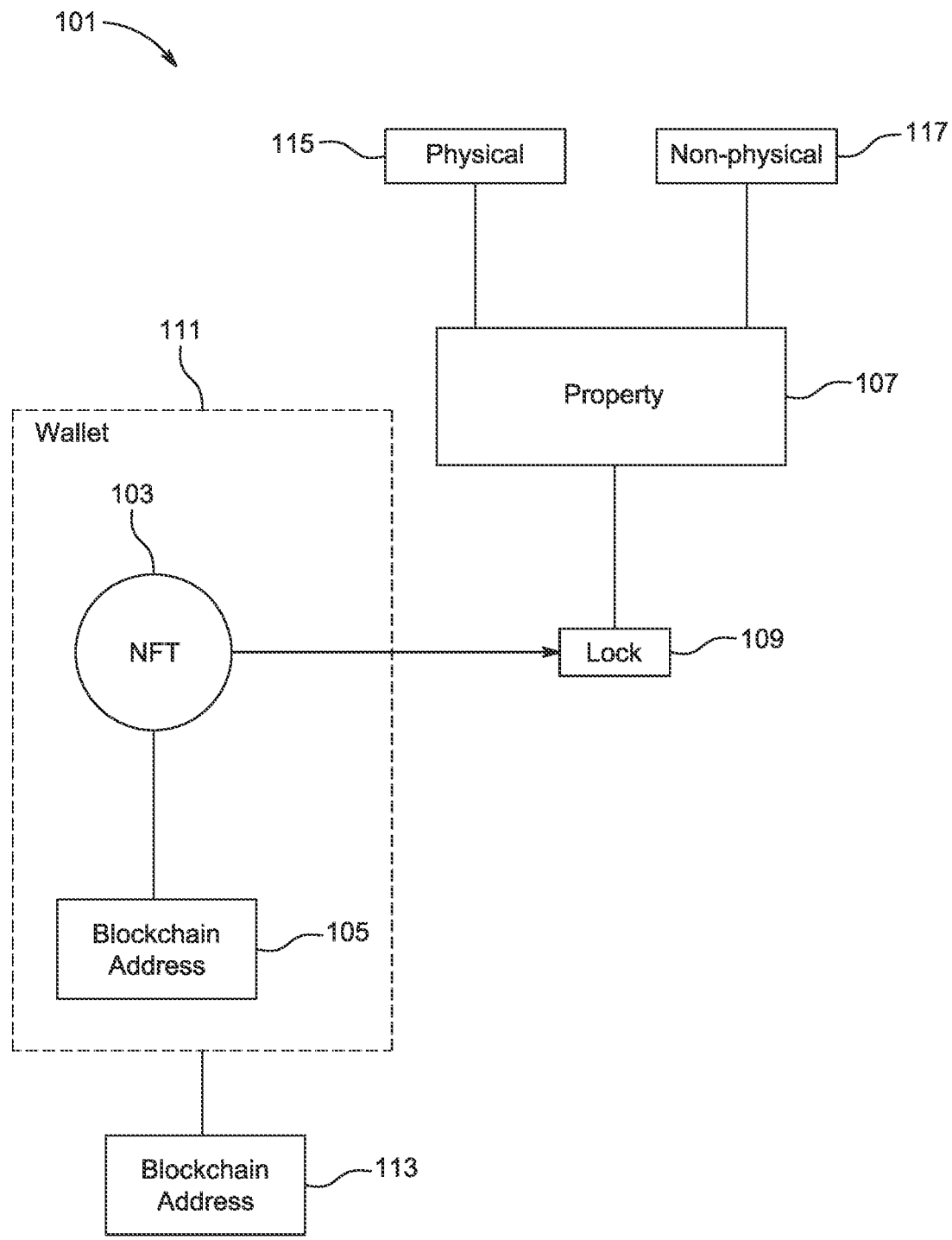
FIG. 1 is a schematic representation of a digital lock and key system in accordance with a preferred embodiment of the present invention.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional lock and key systems. Specifically, the system of the present invention verifies whether a user has a non-fungible token in the designated blockchain address to unlock physical property or non-physical property. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depict a schematic representation of a digital lock and key system 101 in accordance with a preferred embodiment of the present application. It will be appreciated that system 101 overcomes one or more of the above-listed problems commonly associated with conventional lock and key systems.

In the contemplated embodiment, system 101 includes a non-fungible digital token (NFT) 103 having a unique blockchain address 105, and a piece of property 107 having a lock 109. The NFT 103 may be accessed and used through a digital medium 111 such as a digital wallet. The digital medium 111 also includes a unique blockchain address 113.

The property 107 can be physical property 115, non-physical property 117, or both. Examples of physical property 115 include, without limitation, doors, windows, cars, containers, safety deposit boxes, luggage, and the like. Examples of non-physical property 117 include, without limitation, bank accounts, digital wallets, social media accounts, website accounts, and the like.

The lock 109 is configured to recognize a plurality of unique blockchain addresses. For example, when the user presents the NFT 103 to the lock 109, the lock 109 verifies whether the blockchain addresses 105, 111 are one of the plurality of unique blockchain addresses that the lock 109 is configured to recognize. If the lock 109 recognizes the blockchain addresses 105, 111, the lock 109 will "unlock" and grant access to the property 107. If the lock 109 does not recognize the blockchain addresses 105, 111, the lock 109 remains locked and thus, the user cannot get access to the property 107.

It should be appreciated that one of the unique features believed characteristic of the present application is the use of non-fungible digital tokens to verify a user prior to granting access to a physical property or non-physical property, thereby improving security for both property types against fraud.

Figure 2:
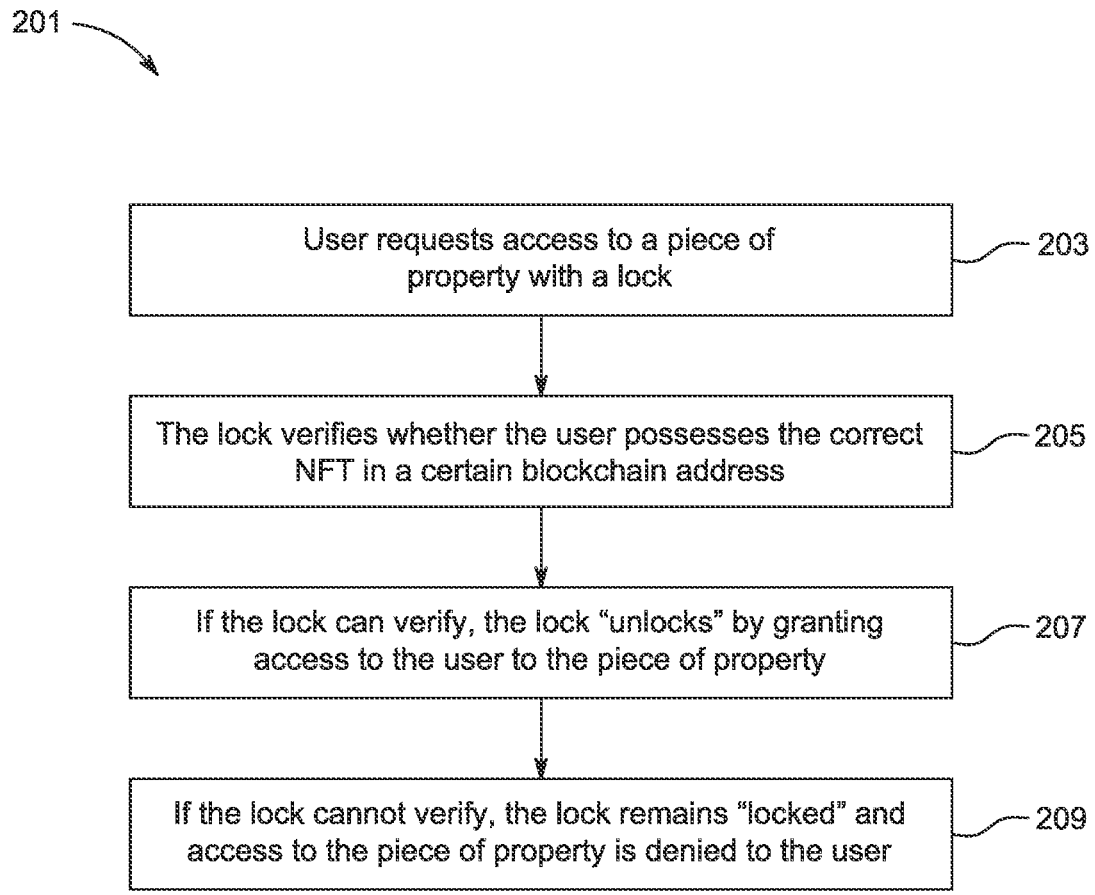
FIG. 2 is a flowchart of a method of use of the system of FIG. 1.

In FIG. 2, a flowchart 201 depicts a method of use associated with system 101. First, a user requests access to a piece of property with a lock, as shown with box 203. Then, the lock verifies whether the user possesses the correct NFT in a certain blockchain address, as shown with box 205. If the lock can verify, the lock "unlocks" by granting access to the user to the piece of property, as shown with box 207. If the lock cannot verify, the lock remains "locked" and access to the piece of property is denied, as shown with box 209.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A digital lock and key system, comprising:
a non-fungible digital token having a unique blockchain address; and
a piece of physical property having a lock;
wherein the lock is configured to recognize a plurality of blockchain addresses;
wherein the non-fungible digital token is used by a user to request access to the piece of physical property;
wherein the lock verifies whether the user possesses a non-fungible digital token having a blockchain address that matches at least one of the plurality of blockchain addresses recognized;
wherein the lock grants access to the user to the piece of property when the lock verifies that the user possesses a non-fungible digital token having a recognized blockchain address; and
wherein the lock denies access to the user to the piece of physical property when the lock cannot verify that the user possesses a non-fungible digital token having a recognized blockchain address.

2. A method for using a non-fungible digital token to lock or unlock a piece of property, the method comprising:
providing the system of claim 1;
requesting access to the piece of property;
wherein the lock grants access to the user to the piece of property when the lock verifies that the user possesses a non-fungible digital token having a recognized blockchain address;
wherein the lock denies access to the user to the piece of property when the lock cannot verify that the user possesses a non-fungible digital token having a recognized blockchain address.

* * * * *